United States Patent [19]

Vollmer et al.

[11] Patent Number: 4,679,767

[45] Date of Patent: Jul. 14, 1987

[54] SOLENOID ARRANGEMENT INCLUDING YOKE-ENCLOSED COIL AND DOUBLE ENCAPSULATION

[75] Inventors: David J. Vollmer, Ironia; James E. Greame, Long Valley, both of N.J.

[73] Assignee: Automatic Switch Company, Florham Park, N.J.

[21] Appl. No.: 796,757

[22] Filed: Nov. 12, 1985

[51] Int. Cl.[4] ........................ F16K 31/06; H01F 5/06; H01F 7/16

[52] U.S. Cl. ............................... 251/129.15; 335/260; 335/278

[58] Field of Search ................... 251/129.15; 335/260, 335/278; 336/96, 205

[56] References Cited

U.S. PATENT DOCUMENTS

| | | | |
|---|---|---|---|
| 3,262,027 | 7/1966 | Zaleske et al. | 251/129.15 X |
| 3,598,360 | 8/1971 | Merriner et al. | 251/129.15 |
| 4,067,541 | 1/1978 | Hunter | 335/260 X |
| 4,172,964 | 10/1979 | Reinebach | 336/96 X |
| 4,186,363 | 1/1980 | Schmidt, Jr. et al. | 335/278 |
| 4,195,201 | 3/1980 | Gryl, Jr. et al. | 336/96 X |
| 4,405,912 | 9/1983 | Palma et al. | 335/260 |

*Primary Examiner*—Arnold Rosenthal
*Attorney, Agent, or Firm*—Alan H. Levine

[57] ABSTRACT

A solenoid arrangement including a coil of electrically conductive wire and a yoke of magnetic material surrounding the coil. The coil is completely encapsulated by a thermosetting resin, the resin being located between the coil and the yoke, and the yoke being encapsulated by a thermoplastic resin. Preferably, the thermosetting resin is an epoxy resin, and the thermoplastic resin is nylon. The yoke includes a side wall extending around the entire periphery of the coil, a top wall, and a bottom wall, the side, top, and bottom walls forming a box-like housing which substantially completely encloses the coil. A stationary armature extends from the top wall of the yoke into the center of the spool upon which the coil is wound, and a sleeve for accommodating a core tube extends from the bottom wall into the center of the spool.

14 Claims, 4 Drawing Figures

FIG. 3
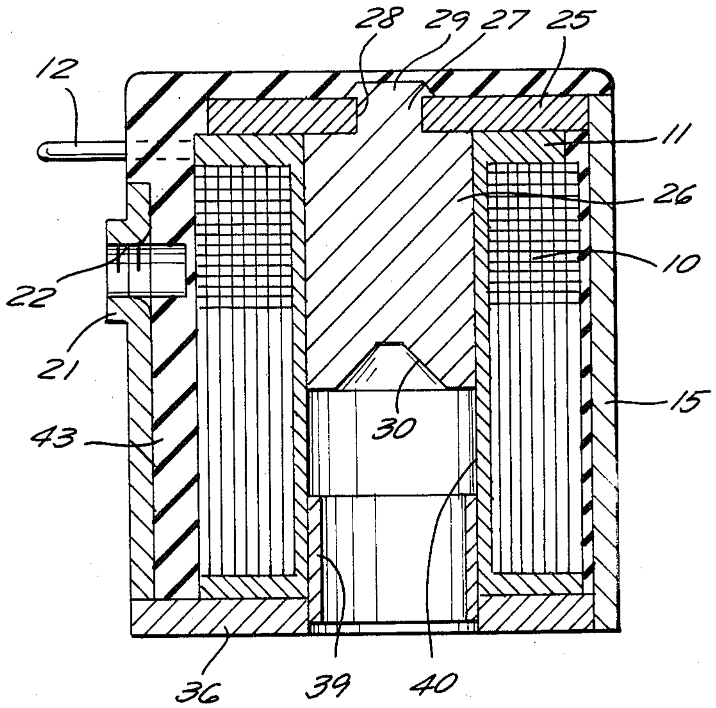
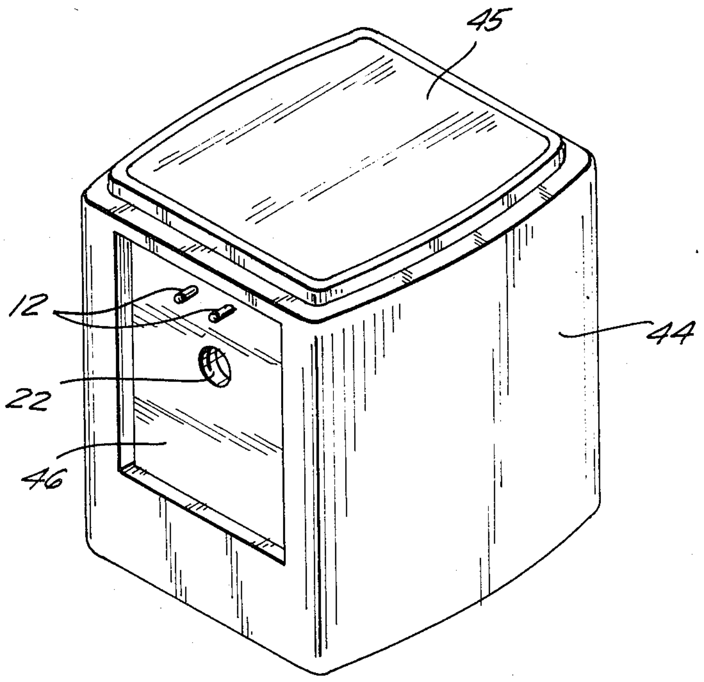
FIG. 4

SOLENOID ARRANGEMENT INCLUDING YOKE-ENCLOSED COIL AND DOUBLE ENCAPSULATION

This invention relates to solenoid arrangements of the type used to operate a wide variety of devices in response to electrical signals. For example, solenoid arrangements are commonly used to open and close valves which control the flow of fluids.

Typically, a solenoid arrangement includes a coil of electric wire, a U-shaped steel yoke adjacent to the coil for defining a magnetic circuit, the axis of the coil extending between the arms of the U, and a plastic encapsulation around the yoke and coil.

It is common practice to use a thermosetting resin, typically an epoxy resin, as the encapsulating material. Such resins, when cured, are very hard and resist breakage. It is important that the encapsulation retain its integrity, since if it breaks, the current-carrying coil will be exposed. This is not only dangerous, but also exposes the coil to damage.

While thermosetting resin encapsulations are hard, they are also brittle. Hence, they can crack in response to a blow or to being dropped. Furthermore, the coefficient of thermal expansion of typical thermosetting resins used for encapsulation is different enough from the coefficient of thermal expansion of the steel yoke that when the heat from the energized coil causes the yoke to expand, this expansion can cause the encapsulation to crack.

It is an object of the present invention to overcome these problems by providing a solenoid arrangement having an exterior encapsulation more resistant to cracking than conventional thermosetting encapsulations.

It is another object of the present invention to provide a solenoid arrangement so constructed that even if the outer encapsulation should break, the coil will not be exposed.

It is a further object of the present invention to provide a solenoid arrangement having an inner encapsulation, immediately surrounding the coil, formed of a thermosetting resin, and an outer encapsulation of a thermoplastic resin.

It is an additional object of the invention to provide a solenoid arrangement wherein the yoke forms a box-like housing substantially completely enclosing the coil.

Additional objects and features of the present invention will be apparent from the following description, in which reference is made to the accompanying drawings.

In the drawings:

FIG. 3 is a cross-sectional view of a solenoid arrangement prior to application of the outer encapsulation; and FIG. 4 is a perspective view of the finished solenoid arrangement.

Figure 2:
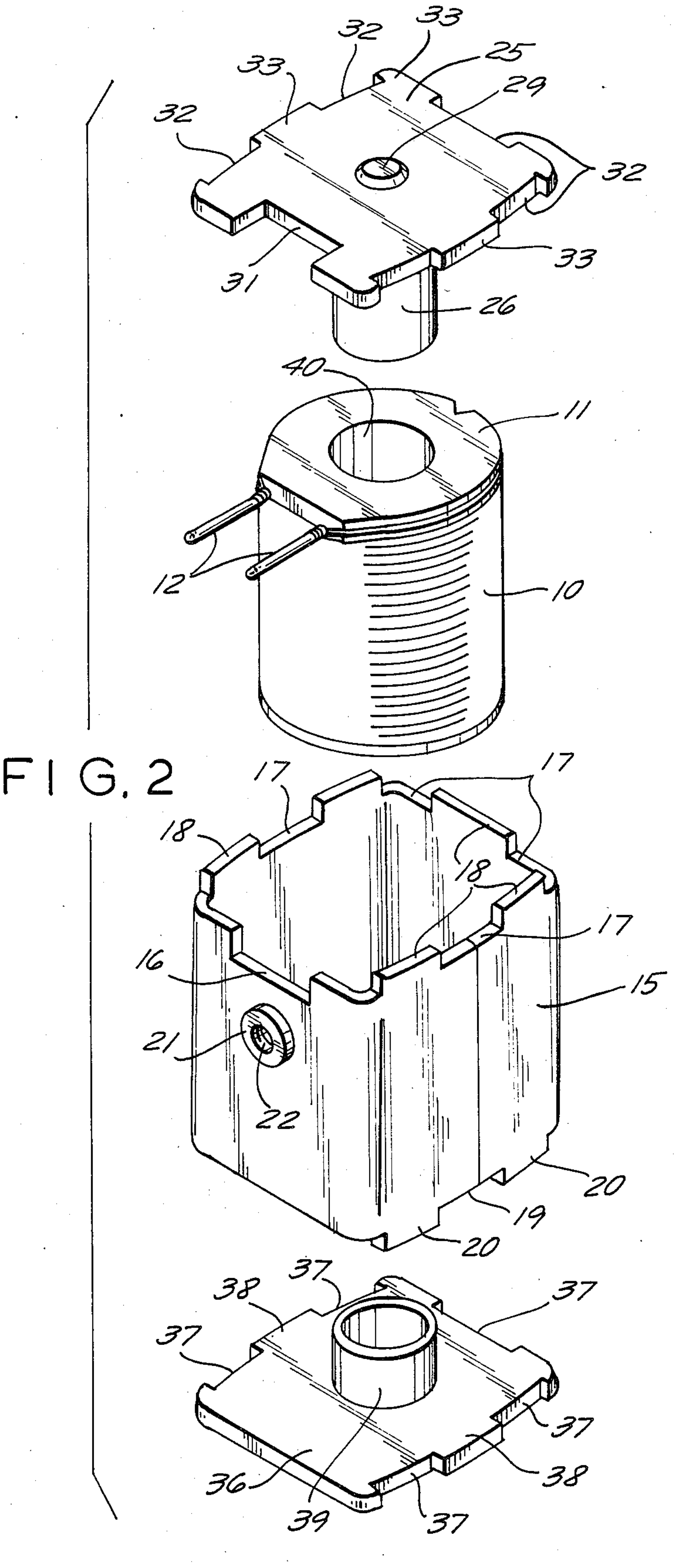
FIG. 2 is an exploded perspective view of a coil and yoke according to the present invention.

Referring to FIG. 2, the solenoid arrangement chosen to illustrate the present invention includes a coil of electrically conductive wire 10 wound upon a spool 11 made of non-electrically and non-magnetically conductive material. The two ends of coil 10 are connected to a pair of pins 12, respectively, which serve as electrical terminals for the coil.

The yoke includes a side wall 15 having a series of notches 16 and 17 in its upper edge defining between them a series of tongues 18. The lower edge of side wall 15 is similarly formed with notches 19 and tongues 20. A boss 21 projects outwardly from one face of side wall 15, and surrounds an internally threaded hole 22 which extends completely through the thickness of wall 15.

The internal dimensions of said wall 15 are sized to completely accommodate coil 10 and spool 11. When the coil and spool are inserted into the side wall, the side wall is radially spaced from the spool and coil, and pin terminals 12 extend outwardly beyond side wall 15 through notch 16.

The yoke also includes a top wall 25 of a magnetic material, preferably steel. Fixed to, and projecting downwardly from, the center of top wall 25 is a cylindrical stationary armature 26, also formed of a magnetic material, such as steel. As seen most clearly in FIGS. 1 and 3, the upper end 27 of armature 26 is reduced in diameter and passes through a hole 28 in top wall 25. The upper end 29 of portion 27 is enlarged so as to permanently join together armature 26 and top wall 25. The lower face of armature 26 is formed with a frustoconical depression 30 (FIG. 3).

Around it peripheral edge, top wall 25 is formed with a series of notches 31 and 32, and tongues 33 (FIG. 2). Each of the tongues 33 of top wall 25 fits into one of the notches 17 in the upper edge of side wall 15. Similarly, each of the tongues 18 of the side wall fit into notches 32 of the top wall. In this way, the tongues and notches serve as locating means for defining the relative positions of the top and side walls when those parts are assembled. They also serve to interlock the parts so as to minimize the chance of disassembly. Notch 31 in top wall 25 registers with notch 16 in side wall 15 so as to provide a clearance completely around terminals 12 when the parts are assembled.

A bottom wall 36, also formed of steel or other magnetic material, is provided along its peripheral edge with notches 37 and tongues 38 for cooperation with tongues 20 and notches 19, respectively, along the lower edge of side wall 15, when the parts are assembled. At the center of bottom wall 36, a tubular sleeve 39, preferably of steel, is fixed to, and projects upwardly from, the bottom wall.

When the parts shown in FIG. 2 are assembled, as shown in FIG. 3, stationary armature 26 and sleeve 39 fit snuggly within the axial hole 40 of spool 11. The armature and sleeve thereby serve to locate and hold coil 10 in a position in which it is radially spaced around its entire periphery from side wall 15. It will be appreciated that side wall 15, top wall 25, and bottom wall 36 provide a box-like housing which substantially completely encloses coil 10 and spool 11.

After the coil 10 and yoke 15, 25, 36 are assembled, the space between coil 10 and side wall 15 is filled with a thermosetting resin 43, preferably an expoxy resin. This can be done by placing the assembled coil and yoke in a fixture or mold, and injecting the liquid resin through hole 22. The resin 43 not only fills the space between coil 10 and side wall 15, but also flows outwardly through the opening provided by notches 16 and 31 to the region above top wall 25.

Figure 1:
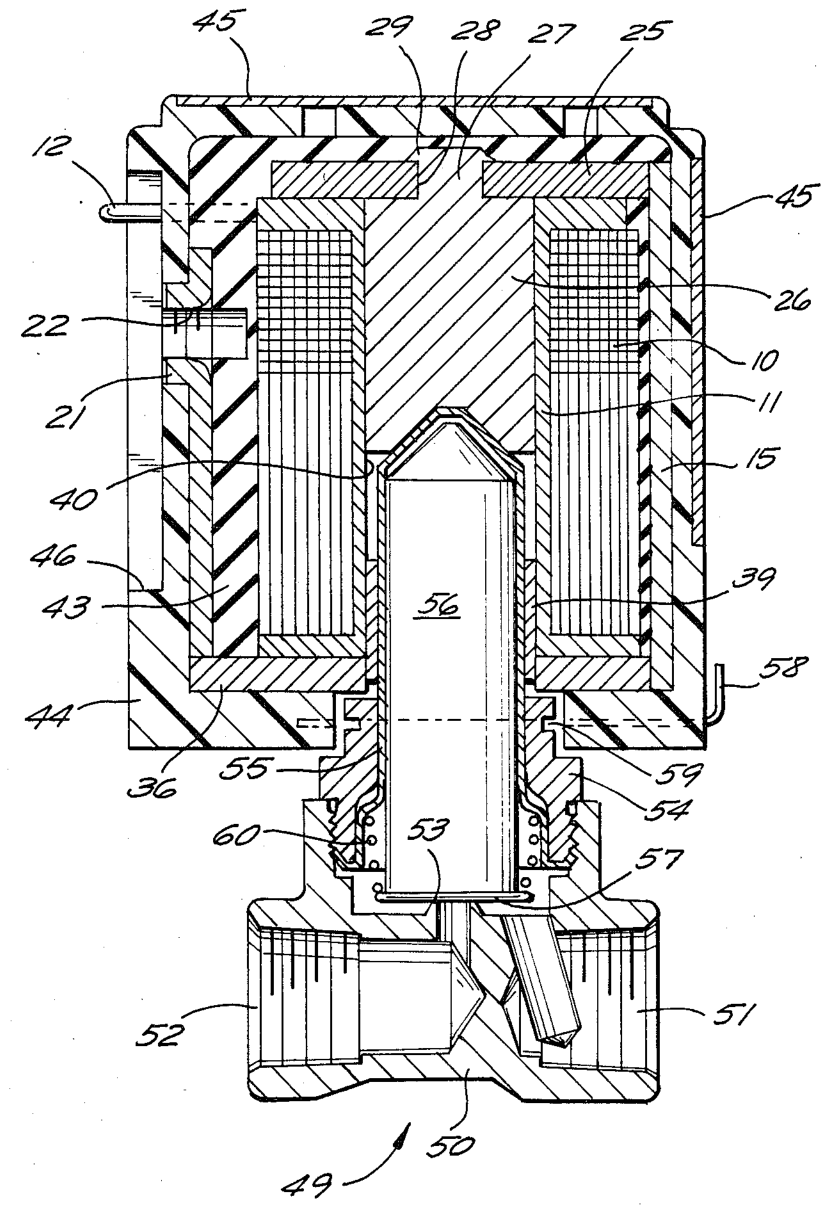
FIG. 1 is a cross-sectional view of a solenoid arrangement, according to the present invention, used to operate a valve.

Thereafter, the unit shown in FIG. 3, comprising the coil, yoke, and thermosetting resin, is placed into a mold, and thermoplastic resin 44, preferably nylon, it molded around substantially the entire outside of the unit, as shown in FIG. 1. This outer encapsulation 44 may be formed, on its top and rear faces, with shallow recesses for accommodating plates or labels 45 which bear information about the characteristics of the solenoid, and perhaps a trademark and the trade name of the manufacturer. On its front face, encapsulation 44 may be formed with a deeper depression 46 (FIGS. 1 and 4) for accommodating an electrical connection module (not shown) used to connect coil terminals 12 to a source of electric power. Threaded hole 22 is adapted to receive a threaded bolt for securing the module to the solenoid arrangement.

It will be appreciated that the solenoid arrangement according to the present invention includes a double encapsulation. Specifically, the coil is encapsulated by a thermosetting resin 43 located between the coil and the yoke. A thermosetting resin, such as expoxy, has excellent heat-resistant properties, and hence will not be adversely affected by the heat generated when coil 10 is energized. The yoke is encapsulated by an outer encapsulation 44 of a thermoplastic material, such as nylon. This material is tough and much less brittle than the inner incapsulation 43. Consequently, expansion of yoke 15, 25, 36 will not cause the outer encapsulation 44 to crack. At the same time, since the outer encapsulation is not in direct contact with coil 10, it is not subjected to the high temperatures of the coil, which a thermoplastic material might not be able to withstand.

Moreover, it will be seen that coil 10 is not protected only by a plastic encapsulation. Instead, the coil is located within the metal box-like yoke. Consequently, even if the outer encapsulation 44 should, for some reason, break, coil 10 will not be exposed, but will continue to be protected by a metal enclosure, which is the yoke. Thus, the present arrangement provides for a very secure housing for the coil, making this solenoid safe for use in virtually all environments.

The solenoid arrangement according to this invention may be used to operate a wide variety of devices. An example of such devices is the valve 49 shown in FIG. 1. Valve 49 includes a valve body 50 having a fluid inlet port 51, a fluid outlet port 52, amd a valve seat 53 between those ports. A bonnet 54 is threaded into the valve body, the bonnet carrying a non-magnetic core tube 55. The upper end of the core tube 55 has a frusto-conical shape which fits into the depression 30 in stationary armature 26. Slidable within core tube 55 is a movable armature 56 formed of magnetic material, the upper end of the armature having a frusto-conical shape corresponding to that of the upper end of the core tube 55. The lower end of armature 56 carries a valve element 57 of resilient material adapted to cooperate with valve seat 53.

The solenoid arrangement is assembled with the valve by sliding core tube 55 through sleeve 39 until the upper end of the core tube engages the lower face of stationary armature 26, as shown in FIG. 1. A spring clip 58, slidable within outer encapsulation 44, is then moved to engage an annular slot 59 in bonnet 54 so as to hold the solenoid assembly and valve together. In FIG. 1, coil 10 is deenergized, and hence a spring 60 holds valve disk 57 against valve seat 53 to close the valve. When coil 10 is energized, armature 56 rises within core tube 55, to close the gap shown between the top of armature 56 and the top wall of core tube 55, thereby lifting valve disk 57 off valve seat 53 to open the valve.

The invention has been shown and described in preferred form only, and by way of example, and many variations may be made in the invention which will still be comprised within its spirit. It is understood, therefore, that the inventin is not limited to any specific form or embodiment except insofar as such limitations are included in the appended claims.

We claim:

1. A solenoid arrangement comprising:
a coil of electrically conductive wire,
a yoke of magnetic material surrounding the coil,
the coil being completely encapsulated by a thermosetting resin, the resin being located between the coil and the yoke, and
the yoke being substantially completely encapsulated on all sides by a thermoplastic resin, so that none of the thermosetting resin is exposed on the exterior of the solenoid arrangement.

2. A solenoid arrangement as defined in claim 1 wherein the thermosetting resin is an epoxy resin.

3. A solenoid arrangement as defined in claim 1 wherein the thermoplastic resin is nylon.

4. A solenoid arrangement as defined in claim 1 wherein the yoke includes a side wall extending around substantially the entire periphery of the coil, a separate top wall engaging one end of the side wall, and separate bottom wall engaging the other end of the side wall, said side, top, and bottom walls of the yoke forming a box-like housing for the coil, the yoke substantially completely enclosing the coil.

5. A solenoid arrangement is defined in claim 4 including a spool upon which the coil is wound, the spool being hollow along its axial centerline, and a stationary armature of magnetic material fixed to the top wall of the yoke and extending therefrom into the hollow interior of the spool.

6. A solenoid arrangement as defined in claim 5 including a tubular sleeve of magnetic material fixed to the bottom wall of the yoke and extending therefrom into the hollow interior of the spool.

7. A solenoid arrangement as defined in claim 4 including locating means carried by the top wall and the side wall for defining the relative positions of the top and side walls when they are assembled.

8. A solenoid arrangement as defined in claim 7 wherein the locating means includes a tongue projecting from the edge of one of the top and side walls, and a notch in the edge of the other wall for accommodating the tongue.

9. A solenoid arrangement as defined in claim 4 including locating means carried by the bottom wall and the side wall for defining the relative positions of the bottom and side walls when they are assembled.

10. A solenoid arrangement as defined in claim 9 wherein the locating means includes a tongue projecting from the edge of one of the bottom and side walls, and a notch in the edge of the other wall for accommodating the tongue.

11. A solenoid arrangement as defined in claim 4 including a pair of terminals projecting from the coil for connection to a souce of electric power, and an opening in one of the walls of the yoke through which the terminals project to the exterior of the yoke.

12. A solenoid arrangement as defined in claim 6 including:
a hollow core tube extending through the sleeve, one end of the tube engaging the stationary armature and the other end projecting outwardly of the thermplastic encapsulation, a valve body having an inlet port, an outlet port, and a valve seat between the ports, means for mounting the core tube on the valve body, a movable armature slidable within the core tube in a direction toward and away from the valve seat, and a valve member carried by the movable armature in a position facing the valve seat, the valve member moving with the movable armature toward and away from the valve seat.

13. A solenoid arrangement comprising:

a coil of electrically conductive wire, a yoke of magnetic material surrounding the coil, the yoke including a side wall extending around substantially the entire periphery of the coil, a separate top wall engaging one end of the side wall, and a separate bottom wall engaging the other end of the side wall, said side, top, and bottom walls of the yoke forming a box-like housing for the coil, the yoke substantially completely enclosing the coil, locating means carried by the top wall and the side wall for defining the relative positions of the top and side walls when they are assembled, the locating means including a tongue projecting from the edge of one of the top and side walls, and a notch in the edge of the other wall for accomodating the tongue, the coil being completely encapsulated by a thermosetting resin, the resin being located between the coil and the yoke, and the yoke being encapsulated by a thermoplastic resin.

14. A solenoid arrangement comprising:

a coil of electrically conductive wire, a yoke of magnetic material surrounding the coil, the yoke including a side wall extending around substantially the entire periphery of the coil, a separate top wall engaging one end of the side wall, and a separate bottom wall engaging the other end of the side wall, said side, top, and bottom walls of the yoke forming a box-like housing for the coil, the yoke substantially completely enclosing the coil, locating means carried by the bottom wall and the far side wall for defining the relative positions of the bottom and side walls when they are assembled, the locating means including a tongue projecting from the edge of one of the bottom and side walls, and a notch in the edge of the other wall for accommodating the tongue, the coil being completely encapsulated by a thermosetting resin, the resin being located between the coil and the yoke, and the yoke being encapsulated by a thermoplastic resin.

* * * * *